(12) United States Patent
Stensen et al.

(10) Patent No.: US 10,533,675 B2
(45) Date of Patent: Jan. 14, 2020

(54) APPARATUS FOR CONTROLLING A FLUID FLOW

(71) Applicant: TechInvent 2 AS, Stavanger (NO)

(72) Inventors: Alf Egil Stensen, Stavanger (NO); Tarald Gudmestad, Naerbø (NO)

(73) Assignee: TechInvent 2 AS, Stavanger (NO)

( * ) Notice: Subject to any disclaimer, the term of this patent is extended or adjusted under 35 U.S.C. 154(b) by 75 days.

(21) Appl. No.: 15/738,627

(22) PCT Filed: Jun. 21, 2016

(86) PCT No.: PCT/NO2016/050134
§ 371 (c)(1),
(2) Date: Dec. 21, 2017

(87) PCT Pub. No.: WO2017/003298
PCT Pub. Date: Jan. 5, 2017

(65) Prior Publication Data
US 2018/0187789 A1    Jul. 5, 2018

(30) Foreign Application Priority Data

Jul. 1, 2015   (NO) .................................. 20150851

(51) Int. Cl.
*F16K 31/00* (2006.01)
*F16K 1/14* (2006.01)
*F16K 31/02* (2006.01)

(52) U.S. Cl.
CPC .............. *F16K 31/002* (2013.01); *F16K 1/14* (2013.01); *F16K 31/025* (2013.01)

(58) Field of Classification Search
CPC ................. F16K 31/002; F16K 31/025; Y10T 137/1624; Y10T 137/1842;
(Continued)

(56) References Cited

U.S. PATENT DOCUMENTS

| 879,393 A | * | 2/1908 | Levilly | ................. F25B 41/062 137/494 |
| 3,211,414 A | | 10/1965 | Webb | |

(Continued)

FOREIGN PATENT DOCUMENTS

| CA | 2483399 | 6/2005 |
| CN | 1295178 | 5/2001 |

(Continued)

OTHER PUBLICATIONS

International Search Report for PCT/NO2016/050134 dated Sep. 9, 2016.

(Continued)

*Primary Examiner* — Marina A Tietjen
*Assistant Examiner* — Frederick D Soski
(74) *Attorney, Agent, or Firm* — Andrus Intellectual Property Law, LLP

(57) ABSTRACT

An apparatus is for controlling a fluid flow. The apparatus has a valve provided with a valve adjuster for controlling a fluid flow through the valve. The valve has a fluid inlet in fluid communication with a fluid inlet conduit, and a fluid outlet in fluid communication with a fluid outlet conduit, for flowing fluid through the valve. The apparatus further has an actuator device capable of undergoing a change in shape, the change in shape of the actuator device providing via a connecting member an attenuated or amplified displacement of a fixation point connected to the valve adjuster, when compared to the change in shape of the actuator device.

20 Claims, 14 Drawing Sheets

(58) Field of Classification Search
CPC ......... Y10T 137/1939; Y10T 137/1963; Y10T 137/1987; Y10T 137/206; Y10T 137/2065; Y10T 137/2071; Y10T 137/6606; Y10T 137/7737; Y10T 137/7782; Y10T 137/91
USPC .................................................. 251/319, 11
See application file for complete search history.

(56) References Cited

U.S. PATENT DOCUMENTS

| | | | |
|---|---|---|---|
| 3,650,505 A | | 3/1972 | Drexel |
| 3,664,582 A | | 5/1972 | Jackson et al. |
| 4,487,213 A | | 12/1984 | Gates et al. |
| 4,565,215 A | | 1/1986 | Cummings |
| 6,262,512 B1 | | 7/2001 | Mahadevan |
| 6,745,838 B2 | | 6/2004 | Watson |
| 6,953,185 B2 | | 10/2005 | Steinborn |
| 7,484,528 B2 * | | 2/2009 | Beyerlein ............. F16K 31/002 137/596 |
| 8,485,498 B2 | | 7/2013 | Takeda et al. |
| 8,820,069 B2 * | | 9/2014 | Makinson ............ F16K 17/386 60/527 |
| 9,206,789 B2 * | | 12/2015 | Foshansky ............. F03G 7/065 |
| 10,124,636 B2 * | | 11/2018 | Hrabal ................... B60C 23/12 |
| 2007/0277877 A1 | | 12/2007 | Ghorbal et al. |

FOREIGN PATENT DOCUMENTS

| | | |
|---|---|---|
| CN | 1481480 | 3/2004 |
| CN | 1252398 | 4/2006 |
| CN | 201818582 | 5/2011 |
| CN | 102316067 | 1/2012 |
| DE | 4026492 | 2/1992 |
| DE | 10217061 | 2/2003 |
| EP | 1355169 | 10/2003 |
| GB | 2276675 | 3/1994 |
| NO | 325342 | 3/2008 |
| WO | 9425188 | 11/1994 |
| WO | 9734116 | 9/1997 |
| WO | 2004016904 | 2/2004 |
| WO | 2007148978 | 12/2007 |

OTHER PUBLICATIONS

Norwegian Search Report for Norwegian Patent No. 20150851 dated Jul. 1, 2015.
Written Opinion for PCT/NO2016/050134 dated Sep. 9, 2016.
Chinese Search Report, Chinese Patent Application No. 2016800381119, dated Nov. 13, 2018.

* cited by examiner

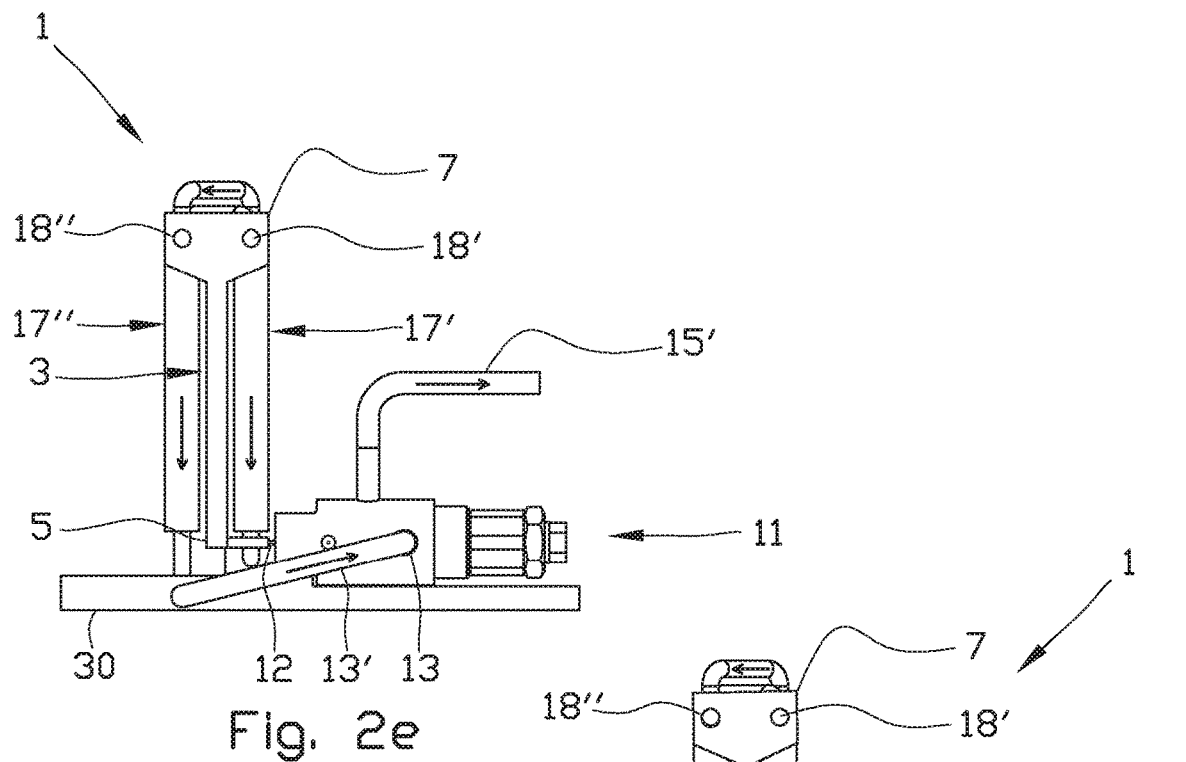
Fig. 2e
Fig. 2f
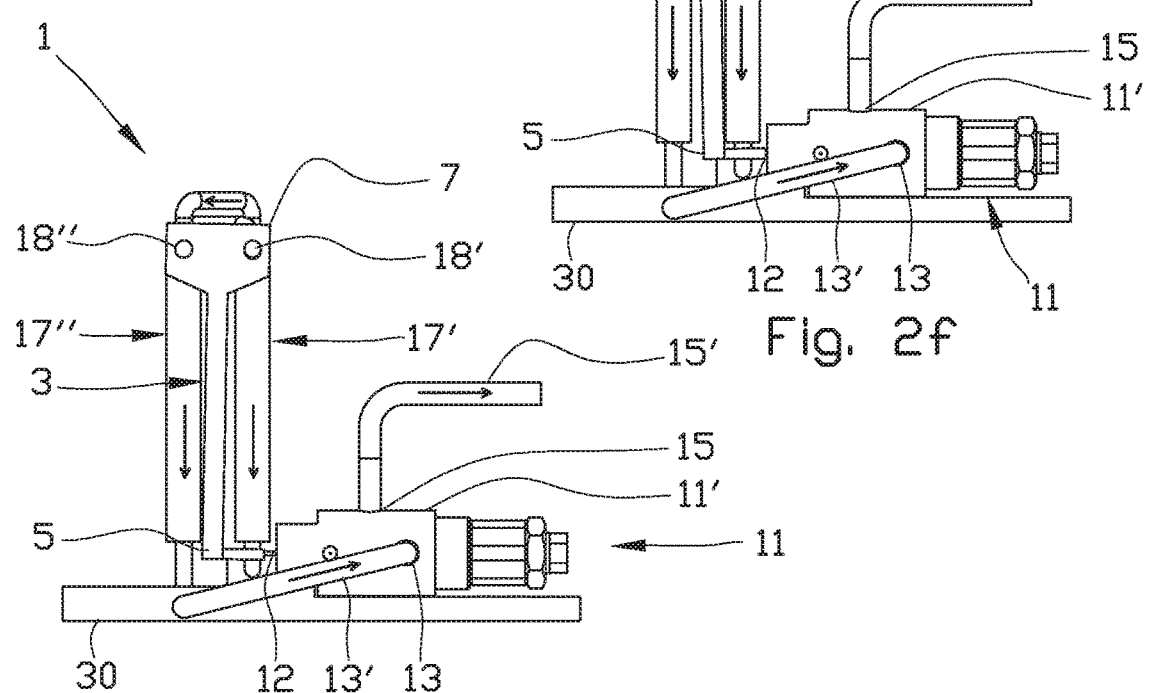
Fig. 2g

APPARATUS FOR CONTROLLING A FLUID FLOW

CROSS-REFERENCE TO RELATED APPLICATIONS

This application is the U.S. national stage application of International Application PCT/NO2016/050134, filed Jun. 21, 2016, which international application was published on Jan. 5, 2017, as International Publication WO 2017/003298 in English language. The International Application claims priority of Norwegian Patent Application No. 20150851, filed Jul. 1, 2015. The international application and Norwegian application are both incorporated herein by reference, in entirety.

FIELD

The present invention relates to an apparatus for controlling a fluid flow. More particularly, it relates to a valve which is operated by material expansion through a controlled change in the energy potential of said material, for example thermal energy, and which is arranged to regulate a substantially constant amount of a desired fluid independently of the pressure, viscosity and temperature of the fluid at the inlet portion of the valve. By the term "valve" is meant a means being capable of regulating or controlling the flow of a fluid (gases, liquids, fluidized solids, or slurries) by opening, closing, or partially obstructing various passageway.

BACKGROUND

The object of the invention is to provide an apparatus which is capable of providing an accurate, fine-tuneable adjustment of a valve while at the same time being not easily influenced by possible impurities in the form of particles in the fluid flowing through the apparatus. A further object is to provide an apparatus, which in one embodiment could be utilized as a flow meter or quantity gauge.

In the petroleum production industry, for example, there is an ever-increasing need for the ability to dose a fluid, such as a liquid chemical, into another medium, a so-called chemical injection. Further, there is an expressed wish and need for the ability to automate and remotely control the chemical injection systems.

Today there are systems commercially available, and also systems known from the patent literature, describing the dosing of fluids into, for example, hydrocarbon wells by the use of different control valves. Such control valve may for example be a damper, a choke, a needle and a gate control valve, also by the use of thermally sensitive and self-adjusting control valves. Examples of such systems are disclosed in publications CA 2 483 399, U.S. Pat. Nos. 6,745,838, 4,565,215, WO 97/34116, WO 2004/016904 and WO 94/25188, EP 1 355 169 and GB 2 276 675. However, it turns out that all the control valves shown in the above-mentioned publications, and systems which are commercially available, have at least one of the drawbacks mentioned in what follows.

In the automation and remote control of, for example, chemical injection there is a need for an actuator, which is arranged to regulate the amount of fluid, which is injected into a fluid flow. It is normal that such actuators are constituted by one or more electric, hydraulic or pneumatic motors which is/are connected to a control valve. This represents drawbacks related both to the space requirement and to repair and maintenance, which will necessarily have to be carried out on mechanically movable parts over time. To have control over the amount of fluid injected, there is additionally the need for a flow gauge or a so-called "flow meter" which needs to be connected to a portion of the conduit in which the injection fluid is conveyed. Such a flow meter is relatively space demanding, introduces many complex and maintenance-demanding parts and represents a considerable drawback both in the investment phase and in the operation phase.

A substantial proportion of the dosing systems used in the injection of chemicals are sensitive to the viscosity of the chemicals, which is, in turn, influenced by temperature, so that the viscosity increases when the temperature falls. To avoid too high a viscosity, there may therefore be the need to provide the supply system of the chemicals with heat and/or insulation, which represents in turn economic and operational drawbacks.

A number of the known regulating systems have turned out to be sensitive to impurities because of narrow flow areas, for example in the so-called "orifice". Therefore, to avoid impurities, there is a need for a filter system retaining impurities. Such filter systems require servicing in the form of relatively frequent replacement of filters. This represents a particularly great disadvantage where the access to the filter system is difficult or limited.

Publication CN 201818582 U discloses an automatic feeding mechanism for a cutting device wherein the feeding mechanism is controlled by means of a hydraulic valve.

The present inventor has invented an apparatus that has proven to at least reduce one or more drawbacks of prior art apparatuses. The apparatus is disclosed for example in publication WO 2007148978 A1 describing inter alia a regulating device for regulating a fluid flow, the regulating device comprising an actuator element including a first restriction device, and a regulating device body including a second restriction device and forming, together with said first restriction device, the choke device of the regulating device, the regulating device being provided with a flow area arranged to convey fluid between a fluid inlet and a fluid outlet, and the actuator element or regulating device body being disposed at least in a portion of the regulating device body and actuator element, respectively, wherein the actuator element and regulating device body are connected in such a way that the actuator element and the regulating device body are arranged to move freely independently of each other in consequence of a material expansion or material contraction, the through-put of the choke device being indirectly influenced by an energy source which is arranged to supply energy to at least one of the actuator element and/or regulating device body.

The publications U.S. Pat. Nos. 3,650,505 A, 4,487,213 A and 3,211,414 A disclose apparatuses that have some common features with the apparatus disclosed in the publication WO 2007148978 A1.

The apparatus disclosed in WO 2007148978 A1 has proven to be satisfactory in view of other known prior art apparatuses disclosed in the publications mentioned above. However, the inventor has identified that improvements of said apparatus are possible in order to further remedy or at least reduce one or more drawbacks of the prior art apparatuses.

A further improvement in view of the apparatus disclosed in WO 2007148978 A1, is related to providing an easily replaceable valve that may, if desirable, be of an off-the-shelf type. The apparatus in WO 2007148978 A1 discloses a "tailor-made" valve being fully integrated within the apparatus.

Another improvement to the apparatus disclosed in WO 2007148978 A1 is that the apparatus in accordance with the present invention may be more responsive. The apparatus in WO 2007148978 A1 is based on a "tube-in-tube" arrangement, meaning that the dimension of the outer tube is highly dependent on the dimension of the inner tube and the annular space between the inner tube and the outer tube. A person skilled in the art will appreciate that a wall thickness of a tube being subject to a pressure also depends on the diameter of the tube. In the apparatus disclosed in WO 2007148978 A1, the wall thickness of the outer tube is therefore relatively large, with a less responsive apparatus as a result. Further, such a tube-in-tube arrangement results in the temperature of the fluid flowing into the apparatus influences to some extent the temperature of the fluid flowing out of the apparatus.

The apparatus disclosed in WO 2007148978 A1 is operated in a 1:1 manner, meaning that the opening and closing of the restriction device (valve) depends on material expansion or contraction of an actuator element in a 1:1 relationship. Such a 1:1 relationship may result in an apparatus being less fine-tunable and/or less responsive.

SUMMARY

The object of the present invention is therefore to remedy or at least reduce one or more drawbacks of the prior art.

The object is achieved through features specified in the description below and in the claims that follow.

The invention is defined by the independent patent claims. The dependent claims define advantageous embodiments of the invention.

In a first aspect, the present invention provides an apparatus for controlling a fluid flow. The apparatus comprises a valve provided with a valve adjuster for controlling a fluid flow through the valve, the valve comprising a fluid inlet in fluid communication with a fluid inlet conduit, and a fluid outlet in fluid communication with a fluid outlet conduit, for flowing fluid through the valve, wherein the apparatus is further comprising an actuator device capable of undergoing a change in shape, said change in shape of the actuator device providing via a connecting member an attenuated or amplified displacement of a fixation point connected to the valve adjuster, when compared to the change in shape of the actuator device.

The change in shape may be a change in length.

The connection member is part of a gear mechanism comprising a first portion and a second portion, the fixation point is the first portion, and the actuator device is connected to the second portion of the gear mechanism, the actuator device configured for undergoing said change in shape by means of a shape transformation source. The gear mechanism is configured to provide a movement of the first portion being different from a movement of the second portion upon activation of the shape transformation source. The actuator device comprises a fluid conduit having a first portion and a second portion, one of which being in fluid communication with the fluid inlet of the valve, and in that at least one of the first portion and second portion of the fluid conduit is provided with and is arranged to be influenced by the shape transformation source in the form of a cooling element, a heating element or a combination thereof.

The gear mechanism may be configured for providing a movement of a valve adjuster of the valve being less than the movement from the change in shape, for example a length, of the actuator device. This has the effect that the valve may be more fine-tunable between a fully open position and a fully closed position as compared with a valve having a 1:1 response to the actuator as is the case for the apparatus disclosed in WO 2007148978 A1.

Alternatively, the gear mechanism may be configured for providing a movement of the valve adjuster being more than the movement from the change in shape of the actuator device. This has the effect that the valve may be very responsive to the actuator device.

As mentioned above, the shape transformation source is a heating element or a cooling element or a combination thereof, such as a Peltier element. The shape transformation may also comprise a so-called smart or intelligent material. A person skilled in the art will appreciate that a smart material is a material that has to respond to stimuli and environmental changes and to activate its function according to these changes. The stimuli may for example be temperature, pressure, magnetic current, electric current, light and mechanical forces. A suitable smart material may therefore be one of or a combination of for example a piezoelectric material, a magnetostrictive material, an electrostrictive material, a rheological material, a thermoresponsive material, a electrochromic material, a fullerene material, a biomimetric material or a smart gel.

The second portion of the gear mechanism may in one embodiment of the present invention comprise two connecting parts; a first connecting part connected to a first end portion of an elongate member, and a second connecting part connected to a second end portion of the elongate member. In such an embodiment, the first portion of the gear mechanism may be arranged in a non-rectilinear member also extending between the connecting parts, and a distance between the first portion and the elongate member is different from the distance between the elongate member and the non-rectilinear element at the connecting parts. In one embodiment, said distance between the first portion and the elongate member is less than the distance between the elongate member and the non-rectilinear element at the connecting parts. In another embodiment said distance between the first portion and the elongate member is larger than the distance between the elongate member and the non-rectilinear element at the connecting parts. The elongate member may be a rectilinear element.

In one embodiment, the non-rectilinear member may be made of a material being different from the elongate member. The non-rectilinear member may be made of for example, but not limited to, a suitable plastic material, while the elongate member may be made of a suitable metal.

In another embodiment, the non-rectilinear member and the elongate member may be made of materials having identical or similar material properties.

In an alternative to the embodiment above comprising the elongate element and the non-rectilinear member, the actuator device may comprise at least two separate elongate members at least one of the members being configured for undergoing change in shape upon activation of the shape transformation source. In this embodiment, the gear mechanism may comprise at least one arm defined by the first portion and the second portion. The second portion may be pivotally connected to two of the at least two separate members by means of pivot connections. The pivot connections are arranged spaced apart with a first distance, and the effective length of the arm is different from said first distance. By "effective length" is meant the length of the arm from the second portion to the first portion interacting with the valve. This has the effect that the gearing ratio is defined by the distance between the pivot connections and the length of the arm. Thus, if the effective length of the arm is smaller than the distance between the pivot connections, the movement of the first portion affecting the valve will be less than the pivoting movement of the second portion. This facilitates fine-tuning of the vale. Similarly, if the effective length of is larger than the distance between the pivot connections, the movement of the first portion affecting the valve will be more than the pivoting movement of the second portion. This facilitates responsiveness of the valve, i.e. a small pivoting movement of the second portion will result in a relatively greater movement of the first portion affecting the valve position.

The at least two elongate members is in one embodiment made of similar or identical materials. In an alternative embodiment, the elongate members may be made of materials having dissimilar material properties.

The fluid conduit having a first portion and a second portion may be arranged fluidly in series, i.e. fluid flows first through one of the portions and thereafter through the other of the portions. By arranging one of the first portion or the second portion in fluid communication with the fluid inlet of the valve, and arranging at least one of the first portion and second portion to be influenced by the shape transformation source, has the effect that the apparatus may be self-regulating as is discussed in more detail in what follows in the specific part of this document. Such a self-regulating embodiment of the apparatus in accordance with the present invention will in this document be denoted "wet apparatus".

In one embodiment, each of the first portion of the fluid conduit and the second portion of the fluid conduit extends between said connecting parts. One of the connecting parts may be configured for providing fluid communication between the first portion and the second portion. The other one of the connecting parts may in such an embodiment serve as a connection means for communicating fluid into and out of the actuator device comprising the fluid conduit, wherein one of the first portion second portion extends rectilinear between the connecting parts, while the other of the first portion and second portion extends non-rectilinear between said connecting parts. This has the effect that the apparatus may be self-regulating as is discussed in more detail in what follows in the specific part of this document.

A "wet apparatus" in accordance with an embodiment of the first aspect of the invention, has proven to be suitable for use as a flow meter for measuring a flow rate through the apparatus. In order to provide such a flow meter, the apparatus must be equipped with a first energy measuring device arranged at a fluid inlet portion of the apparatus, and a second energy measuring device arranged at a fluid outlet portion of the apparatus. When knowing the thermal capacity of the fluid, the flow rate is given by the formula:

$$Gs=I/(Cp*(t2-t1)),$$

in which
Gs is the flow rate of the fluid [g/s];
I is the supplied power [W], wherein I≠0;
Cp is the thermal capacity of the fluid [J/g °K];
t1 is the energy of the fluid measured at the inlet portion of the apparatus (1); and
t2 is the energy of the fluid measured at the outlet portion of the apparatus (1), the self-regulating action of the flow meter causing the energy difference t2−t1 to be constant at a constant supplied power I.

BRIEF DESCRIPTION OF THE DRAWINGS

In what follows, non-limiting examples of preferred embodiments are described, which are visualized in the present drawings, in which:

FIG. 2b shows on a larger scale a transparent detail of the apparatus shown in FIG. 2a;

FIG. 2e-2g show side views of a working principle of a gear mechanism of the apparatus in FIGS. 2a-2d affecting a valve;

DETAILED DESCRIPTION OF THE DRAWINGS

Figure 1A:
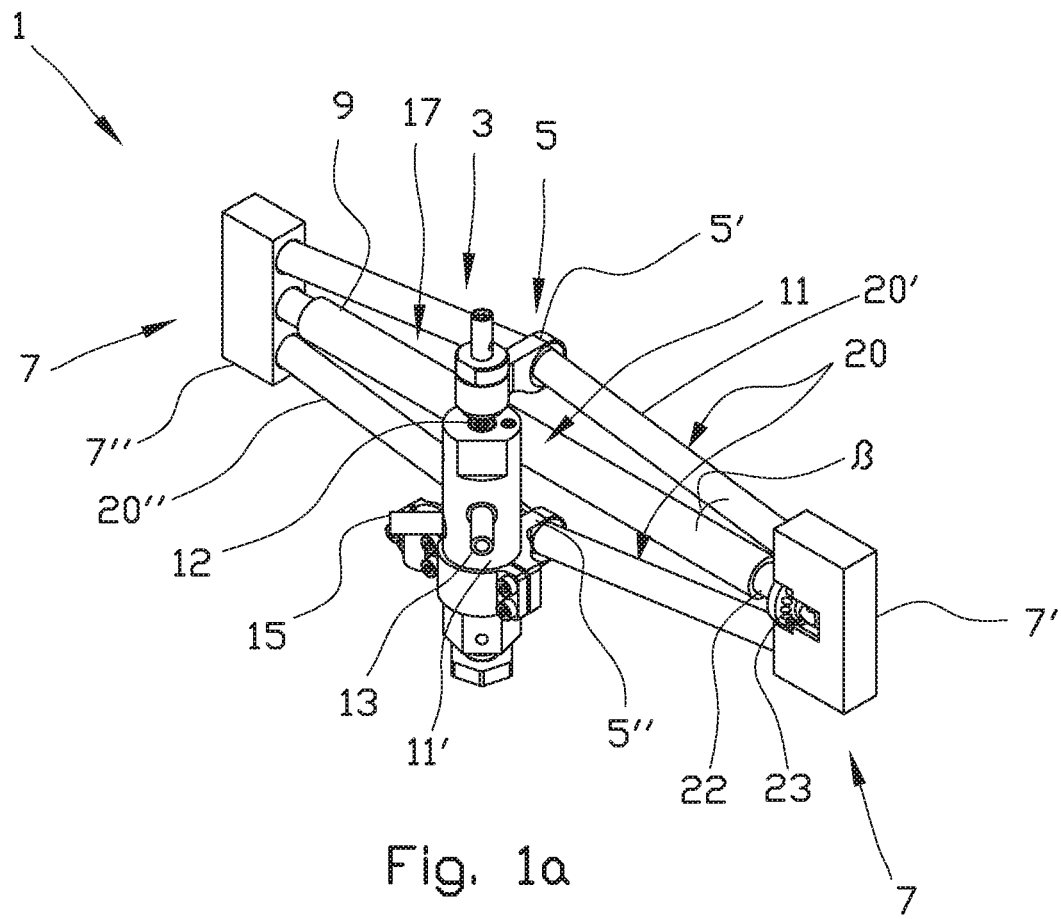
FIG. 1a shows a perspective view of an apparatus in accordance with a first embodiment of the present invention.

Positional specifications such as "over", "under", "lower", "upper", "right" and "left", refer to the positions shown in the figures.

In the figures, the same reference numerals indicate the same or corresponding elements. For the sake of clarity, reference numerals are omitted for some of the elements in some of the figures. As the figures are only principle drawings, the relative size ratios between individual elements may be somewhat distorted.

In the figures, the reference numeral 1 indicates an apparatus for use in the regulation of a fluid flow. The fluid flow is regulated by means of a valve 11 having a fluid inlet 13 being in fluid communication with a fluid inlet conduit 13', and a fluid outlet 15 being in fluid communication with a fluid outlet conduit 15'.

The valve 11 is preferably of a type configured for stepless regulation of the valve between a fully open position and a fully closed position.

In order to provide a fine tunable and responsive apparatus 1, the apparatus 1 is provided with a gear mechanism 3. The gear mechanism 3 comprises a fixation point in the form of a first portion 5 configured for influencing a valve adjuster 12 movably arranged within a housing 11' of the valve 11, and a second portion 7.

An actuator device 17 is connected to the second portion 7 of the gear mechanism 3. The actuator device 17 comprises at least one elongate member 22 being configured for undergoing a change in dimension, i.e. change in shape, upon activation of a shape transformation source 9, here in the form of a thermal source providing a change in temperature.

The purpose of the gear mechanism 3 is to effect a movement of the first portion 5 being different from the movement of the second portion 7 upon activation of the actuator device 17 by means of the shape transformation source 9. Thus, the actuator device providing (via connecting members 20) an attenuated or amplified displacement of the first portion 5 connected to the valve adjuster 12, when compared to the change in length of the actuator device 17.

FIG. 1a-FIG. 1e show a first embodiment of the present invention.

FIG. 1a is a perspective view of an apparatus 1 wherein the second portion 7 of the gear mechanism 3 is constituted by a first connecting part 7' connected to a first end portion of the elongate member 22, and a second connecting part 7" connected to a second end portion of the elongate member 22. The elongate member 22 extends rectilinear between the connecting parts 7', 7".

The elongate member 22 is connected to the first connecting part 7' by means of an isolating member 23 in order to reduce heat transfer between the elongate member 22 and the first connecting part 7'. The isolating member 23 is provided with a plurality of apertures arranged circumferentially within a portion of the member 23 as shown in FIG. 1a-FIG. 1d.

The first portion 5 of the gear mechanism 3 comprises a primary portion 5' clamped to a first connecting member 201 in the form of a first non-rectilinear member, and a secondary portion 5" clamped to a second connecting member 20" (here a second non-rectilinear member) being mirror-inverted with respect to the first connecting member 20' about the elongate member 22. The first and second connecting members 20', 20" each extend between the connecting parts 7', 7" and are connected thereto.

The primary portion 5' of the first portion 5 is connected to the valve adjuster 12, while the secondary portion 5" of the first portion 5 is connected to the valve housing 11'. The effect thereof is that the valve housing 11 connected the secondary portion 5", will be urged in an opposite direction to that of the valve adjuster 12 connected to the primary portion 5', and thus double the relative movement between the valve adjuster 12 and the valve housing 11', as compared with an apparatus having only one connecting member 20.

In the embodiments shown in FIG. 1a-FIG. 1e, the connecting members 20 have a substantially convex shape with respect to the elongate, rectilinear member 22 extending between the connecting parts 7', 7". However, in an alternative embodiment (not shown) the connecting members 20 may have a substantially concave shape. Such a concave shape may be achieved by increasing the vertical height of the connecting parts 7', 7" and connecting the connecting members 20 at top and bottom portions of each of the connecting parts 7', 7" so that the connecting members 20 may extend inwards from the connecting part 7', 7" towards the elongate member 22, i.e. opposite of what is shown in for example FIG. 1a.

In FIG. 1a-FIG. 1d, the shape transformation source 9 surrounds a substantial portion of the elongate member 22.

Figure 1B:
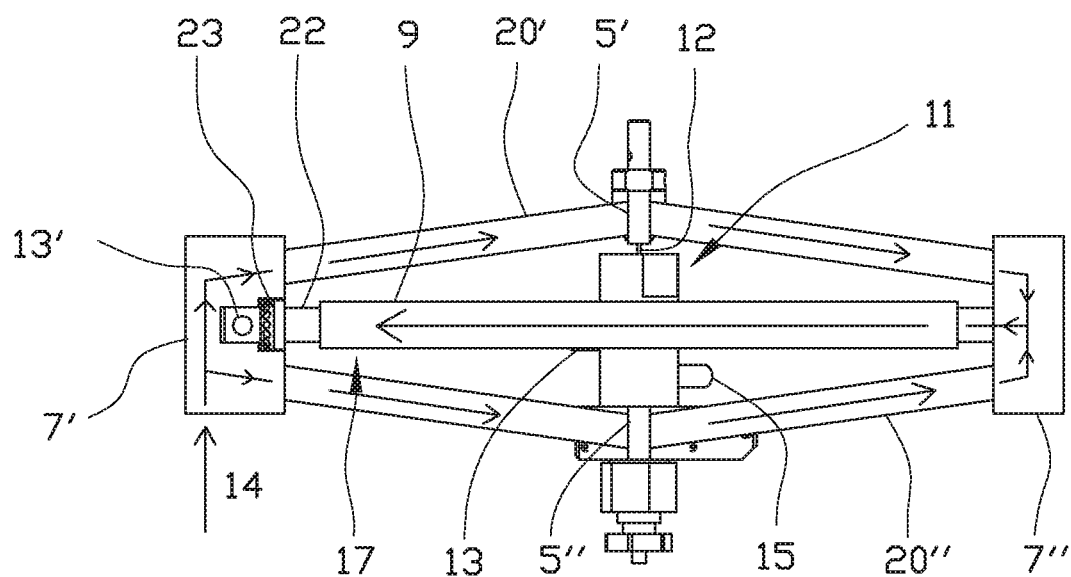
FIG. 1b shows a view of the apparatus in FIG. 1a seen from right to left, wherein a fluid flow through the apparatus is indicated by arrows.
Figure 1C:
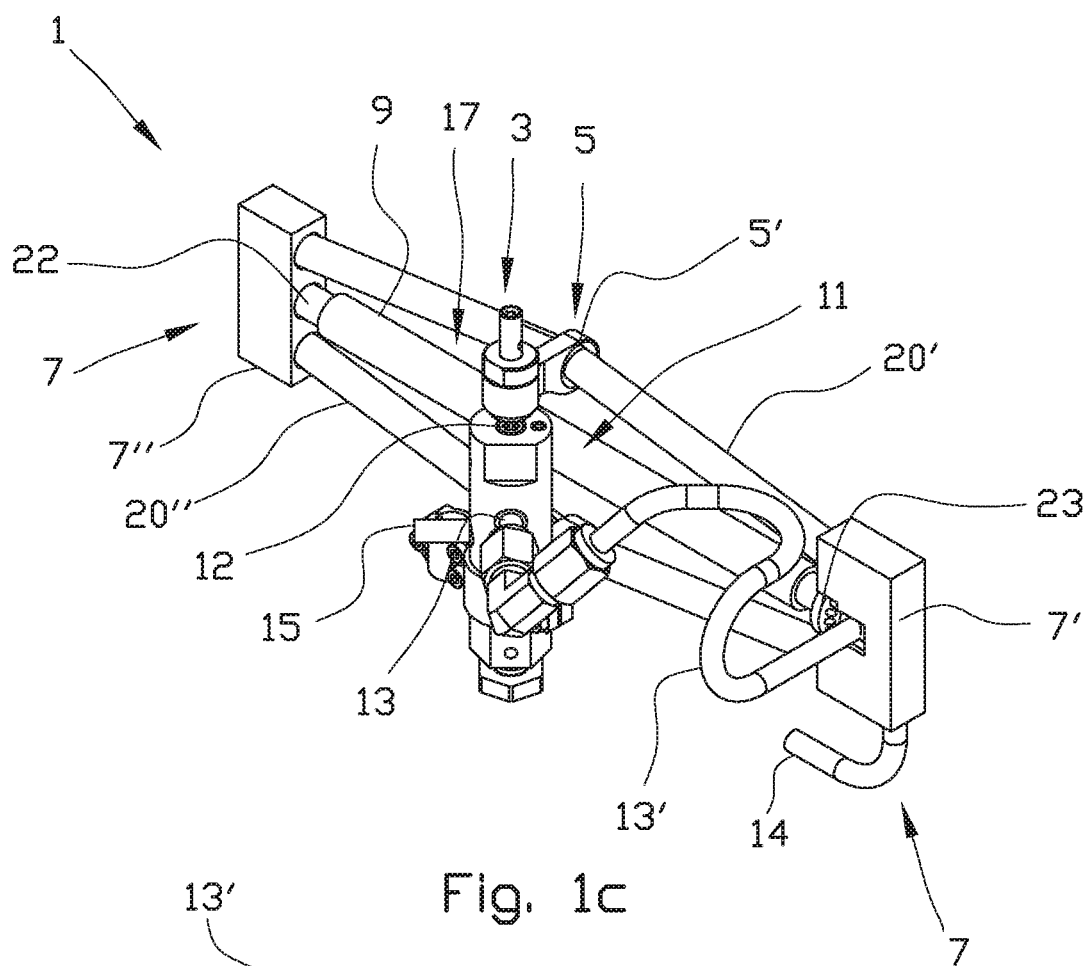
FIG. 1c shows the apparatus in FIG. 1a having fluid conduits providing fluid communication into, within and out of the apparatus.
Figure 1D:
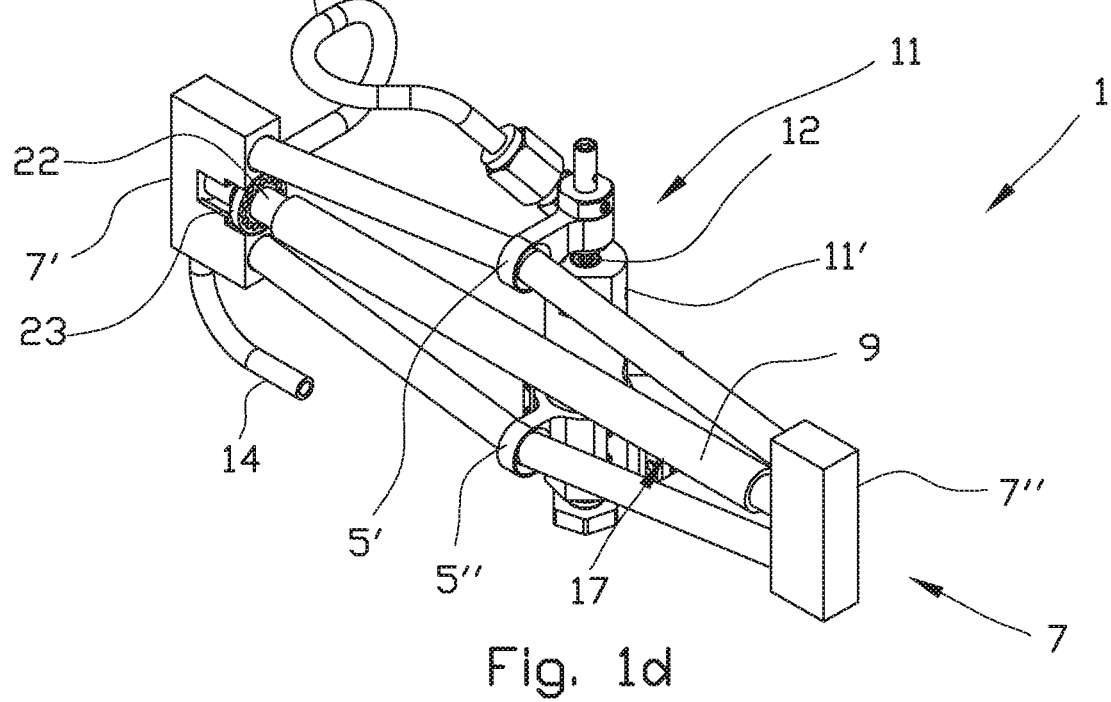
FIG. 1d shows the apparatus in FIG. 1c seen from right to left.
Figure 1E:
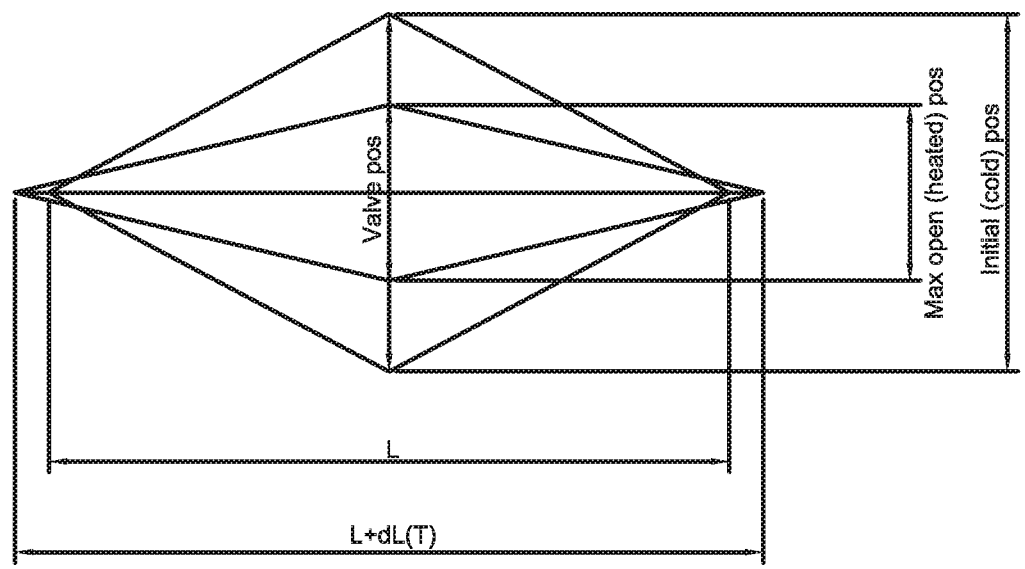
FIG. 1e is a sketch indicating a working principle of the apparatus shown in FIGS. 1a-1d.

When activating said shape transformation source 9 in order to increase for example the temperature of the elongate member 22, a length L of the elongate member will increase by a length dL depending on the amount of heat supplied, see FIG. 1e. The distance between the connecting parts 7', 7" will consequently also increase by dL.

It should be noted that in an embodiment wherein the elongate member 22 is made of a so-called smart material, the length dL may be provided by means of for example an electric current or any other suitable stimuli to which the smart material is responsive, as will be appreciated by a person skilled in the art.

Because of the connection between the connecting members 20 and the connecting parts 7', 7", and also the shown convex shape of said connecting members 20, the primary portion 5' and secondary portion 5" of the first portion 5 connected to the connecting members 20, will be driven a distance in a direction towards each other and thereby influence the fluid flow through the valve 11. By further supplying one or both of the connecting members 20 with a controllable cooling element (not shown), said distance between the primary portion 5' and secondary portion 5" will be further reduced.

Similarly, when activating said shape transformation source 9 in order to reduce for example the temperature of the elongate member 22, i.e. the shape transformation source being a cooling element, a length L of the elongate member will decrease by a length dL depending on the amount of cooling supplied. The distance between the connecting parts 7', 7" will consequently also decrease by dL, and thereby urge the primary portion 5' and secondary portion 5" away from each other. By further supplying one or both of the connecting members 20 with heat from a not shown heating source, said distance between the primary portion 5' and secondary portion 5" will be further increased.

Tests of a prototype of the apparatus have shown that an angle β of about 5-10° between the elongate member 22 and each of the connecting members 20 at the connecting parts 7', 7" is effective with regards to the gearing function of the apparatus 1. In the embodiment shown in FIG. 1a, a gearing of about 4.5 times is achieved, i.e. the movement of the primary portion 5' and the secondary portion 5" towards (or away) from each other is about 4.5 times that of the increase (or decrease) in length dL of the elongate member 22.

Figure 4A:
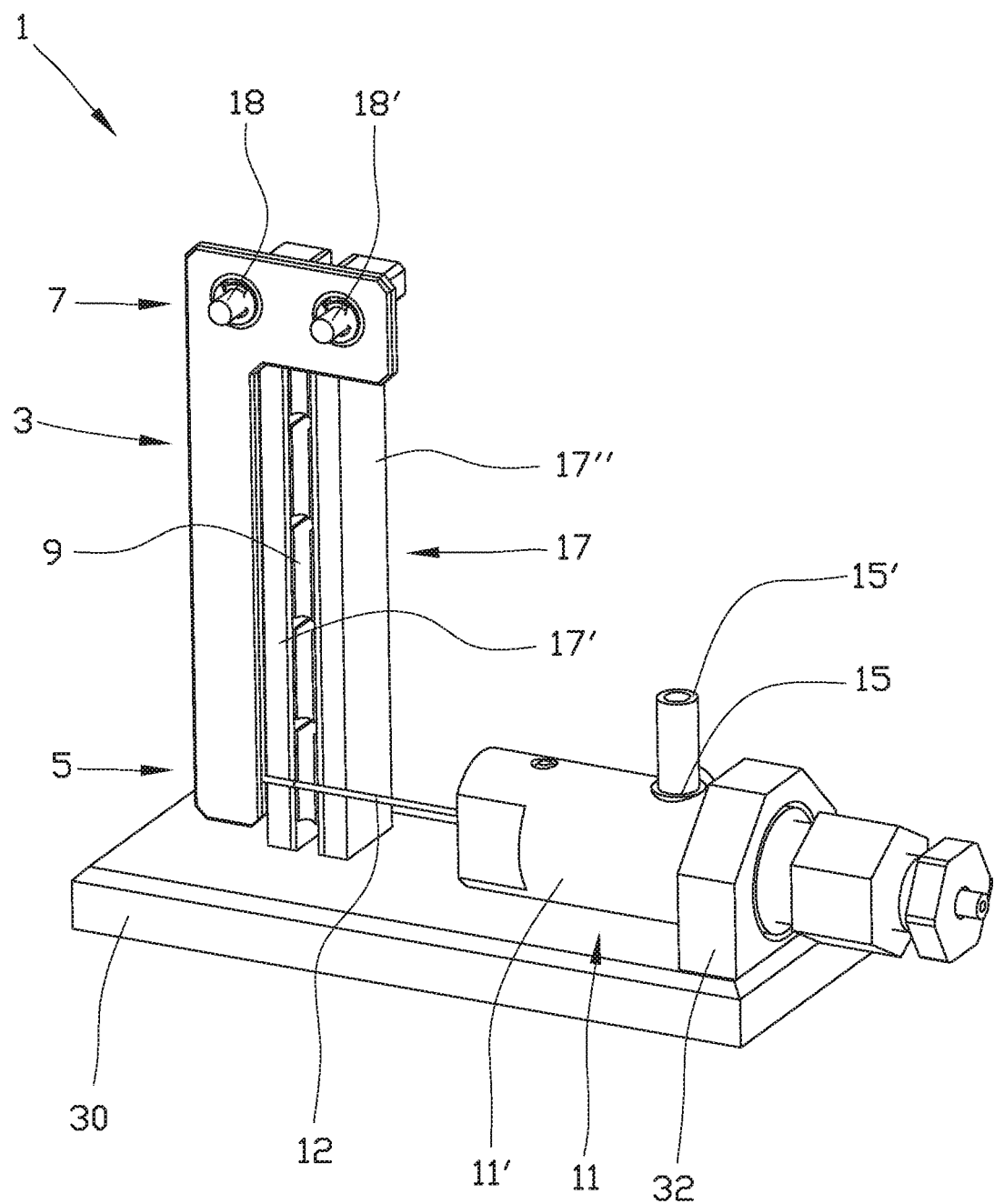
FIG. 4a shows a perspective view of an apparatus in accordance with a fourth embodiment of the present invention.

The apparatus 1 configured as indicated in for example 1a and 1e, comprises a first connecting member 20' and a second connecting member 20". However, in an alternative embodiment (not shown), the apparatus 1 may comprise only one connecting member 20 that is non-rectilinear, preferably the first connecting member 20'. In such an alternative embodiment, the valve housing 11' must be fixed to a base (for example as shown in FIG. 4a), and the gearing effect of the apparatus 1 will be reduced to about one half of the gearing effect achieved by means of the apparatus 1 shown in FIG. 1a.

In the embodiment shown in FIG. 1a, the fluid inlet 13 of the valve 11 may be connected to a fluid inlet conduit 13' (shown in FIG. 1c). The fluid outlet 15 of the valve 11 may be connected a fluid outlet conduit 15' independent of the gear mechanism 3 and appurtenant connecting parts 7', 7", connecting members 20, and the actuator device 17. The fluid flow will in such a case flow through the valve 11 only. Such an apparatus 1 may be denoted a "dry" apparatus.

However, in another embodiment shown in FIG. 1b, the apparatus 1 may be provided with fluid channels allowing fluid flow from a source (not shown) into a fluid inlet 14 of the apparatus, as shown in FIG. 1c and FIG. 1d, in the first connecting part 7', through the above mentioned first portions, here defined in the connecting members 20. The fluid flows thereafter via the second connecting part 7" and further through the above mentioned second portion, here defined in the elongate member 22, before the fluid flows via the fluid inlet conduit 13' being in fluid communication with the inlet 13 of the valve 11. The fluid leaves the apparatus 1 through fluid outlet 15, and flows via a conduit to a destination (not shown). FIG. 1b indicates by means of arrows one possible fluid flow through the apparatus 1. FIG. 1c and FIG. 1d also indicate fluid conduits. Such an apparatus 1 may be denoted a "wet" apparatus.

It should be noted that in an alternative embodiment (not indicated by arrows) the fluid may flow first from a source into the apparatus fluid inlet 14 in the first connecting part 7', through the elongate member 22, via the second connecting part 7" and further through the connecting members 20 before the fluid flows via the fluid inlet conduit 13' being in fluid communication with the inlet 13 of the valve 11.

In one embodiment, independent of the alternative flow directions discussed above, the non-rectilinear members 20, 20' may be provided with cooling elements. The purpose of such cooling elements is to facilitate further the control of the valve 11.

As will be explained below, this "wet" apparatus 1 has favourable features in view of the "dry" apparatus suggested above.

The favourable features are related to self-regulating abilities of the apparatus 1. The self-regulating features are a consequence of the fact that the apparatus tends to achieve energy balance between the fluid flowing through the valve 11 and the energy supplied to the fluid from the shape transformation source 9.

If too much cold fluid is flowing through the valve 11 and thus the apparatus 1, the fluid will for a limited period of time absorb more energy from the elongate member 22 of the actuator device 17 than what is supplied by the shape transformation source that in one embodiment is a thermal source 9. Consequently, the elongate member 22 is cooled so that it is subject to a retraction, whereby the distance between the primary portion 5' and the secondary portion 5" of the gear mechanism increases. From the above it will be understood that the fluid flow through the valve 11 depends on the distance between the primary portion 5' and the secondary portion 5". An increase in said distance will result in reduced opening of the valve 11. The reduced opening of the valve 11 will result in less throughput of fluid. Thereby the thermal loss or the heat transport from the elongate member 22 is reduced and the movement between the primary portion 5' and the secondary portion 5" will cease when the energy, which is transported away with the fluid, substantially equals the energy supplied to the elongate member 22 by the thermal element 9. Thus, energy balance will be achieved between the heat supplied and the heat transported away.

If too little fluid is flowing through the valve 11 and thus the apparatus 1, the fluid will for a limited period of time reduce the heat transfer from the elongate member 22 of the actuator device 17. Consequently, the elongate member 22 is heated so that it is subject to an elongation, whereby the distance between the primary portion 5' and the secondary portion 5" of the gear mechanism 3 decreases. A decrease of said distance will result in increased opening of the valve 11. The increased opening of the valve will result in more throughput. Thereby the thermal loss or the heat transport from the elongate member 22 is increased and the movement between the primary portion 5' and the secondary portion 5" will cease when the energy, which is transported away with the fluid, substantially equals the energy supplied to the elongate member 22 by the thermal element 9. Again, energy balance has been achieved between the heat supplied and heat transported away.

From the above it will be understood that the fluid flow could be regulated by regulating the energy supplied to the thermal element or shape transformation element 9.

A person skilled in the art will understand that the apparatus 1 will not be influenced to any substantial degree by the viscosity of the fluid or the pressure differential through the apparatus 1. This is due to the fact that the valve 11 of the apparatus 1 will adjust towards energy balance, at which the energy supplied from the shape transformation source 9 corresponds to the energy which is being transported away with the fluid flowing through the apparatus 1.

Figures 1F, 1G:
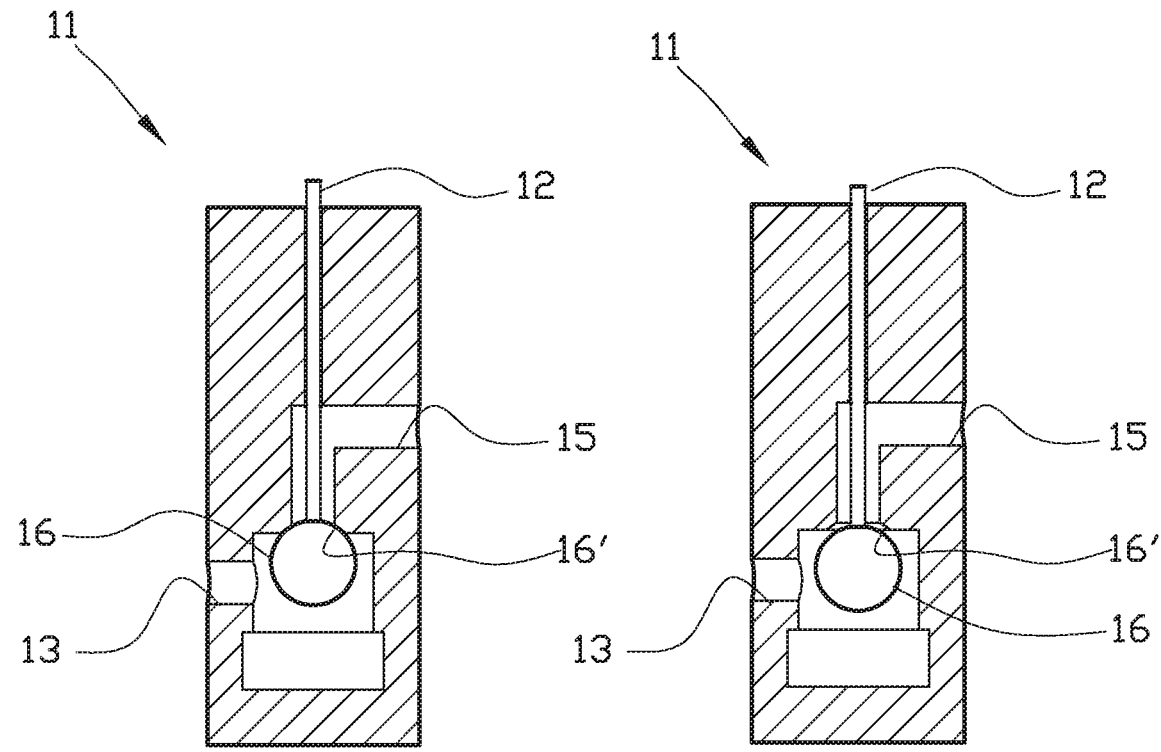
FIG. 1f-1g shows in a larger scale a cross-sectional view through a valve suitable for use in the apparatus, wherein the valve is shown in a closed position and open position, respectively.
Figure 1H:
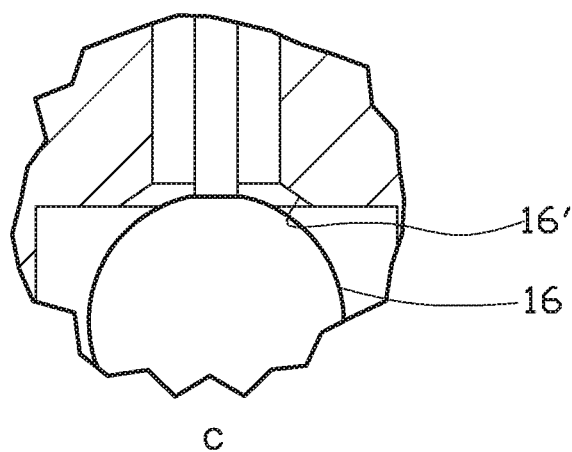
FIG. 1h shows on a larger scale a detail of the valve in FIG. 1g.

A person skilled in the art will appreciate that a valve, for example of a ball- and seat type, may be vulnerable to particles contaminating a fluid flowing into the valve. If a particle is retained between a ball 16 and seat 16' shown in FIG. 1f and FIG. 1g, or for example between a needle and a seat of a needle valve, the fluid throughput will be reduced. Thereby the elongate member 22 will heat up in consequence of the energy supplied to the apparatus 1 from the shape transformation element 9 being greater than the energy transported away from the apparatus with the fluid. In such a situation, it will from the above explanation be appreciated that the valve will open, i.e. the distance between the ball 16 and seat 16' will increase, and the particle that has been retained may be transported by the fluid out of the valve 11. Thereafter, the apparatus will again revert to its initial position before the particle was retained in the valve 11. It should be noted that FIGS. 1f and 1g are a cross-sectional view of a general ball-and seat type valve, and not a cross section of the valve 11 shown in FIG. 1a-FIG. 1d.

FIGS. 2a-2g show a second embodiment of the present invention.

Figure 2A:
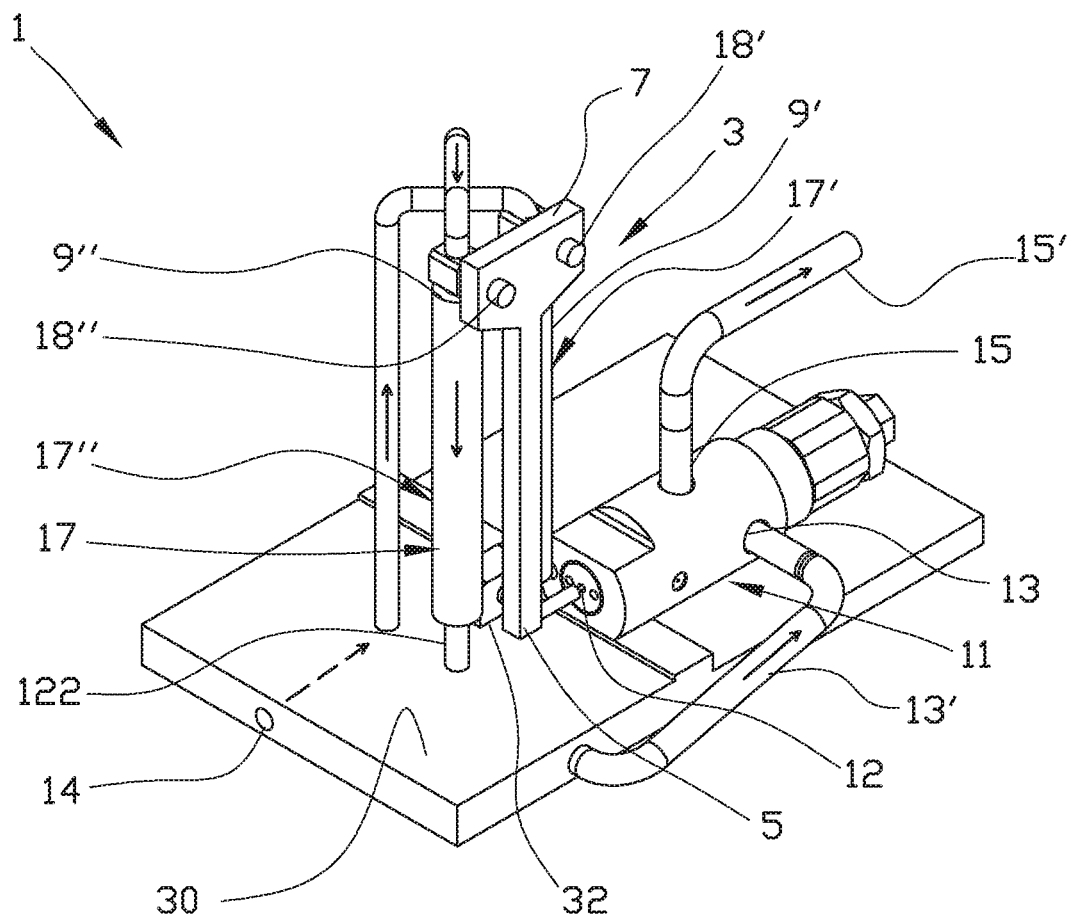
FIG. 2a shows a perspective view of an apparatus in accordance with a second embodiment of the present invention.

FIG. 2a is a perspective view of an apparatus 1 wherein the gear mechanism 3 comprises an arm defined by a first portion 5 connected to a valve adjuster 12 of a valve 11, and a second portion 7 pivotally connected to an actuator device 17.

The actuator device 17 comprises two separate elongate members 17', 17". The separate elongate members 17', 17" are constituted by a fluid conduit having a first portion 120 and a second portion 122. In the embodiment shown, each of the fluid conduit's first portion 120 and fluid conduit's second portion 122 is provided with a shape transformation source in the form of a thermal source 9', 9" respectively. Each of the thermal sources 9', 9" surrounding a part of the first portion 120 and second portion 122 respectively, may be a cooling element, a heating element or a combination thereof. In such a combination, the thermal sources 9', 9" may for example comprise both a heater cable and a cooling coil. In an alternative embodiment, the thermal source may be a Peltier element as shown in for example FIG. 3a.

It should be noted that the apparatus in FIG. 2a will work also if only one of the elongate members 17', 17" of the actuator device 17 is provided with a thermal source 9', 9"'. The gearing effect of the apparatus 1 will in such an embodiment be similar to an embodiment wherein both of the thermal sources 9', 9" are of the same type, i.e. a heating element or a cooling element. The best gearing effect will be achieved if one of the elongate members 17', 17" are subject to heating while at the same time the other of the elongate members 17', 17" are subject to a cooling, and is therefore preferred.

Figure 2B:
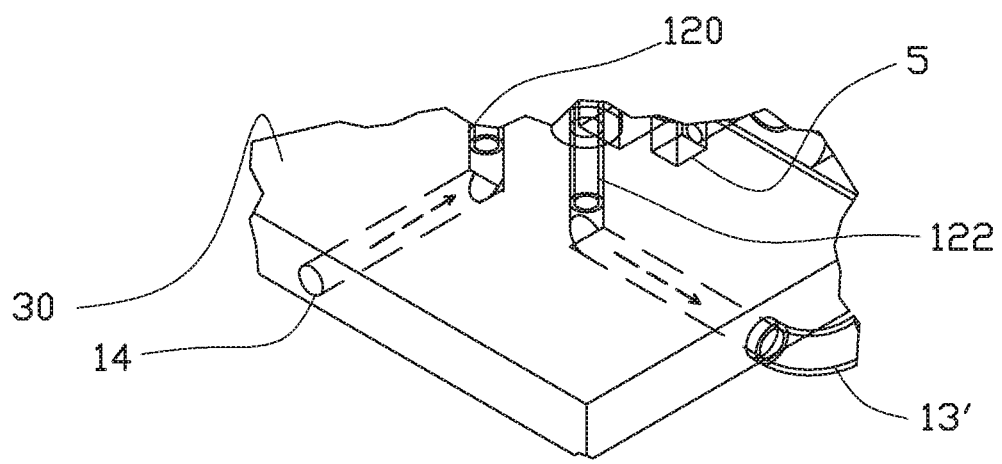

The fluid conduit's first portion 120 is fixed to a base 30 by means of a base clamp 32 as shown in e.g. FIG. 2a, while the fluid conduit's second portion 122 is fixed to or integrated in the base 30 as shown in FIG. 2b showing on a larger scale a transparent view of a detail of FIG. 2a.

Figure 2C:
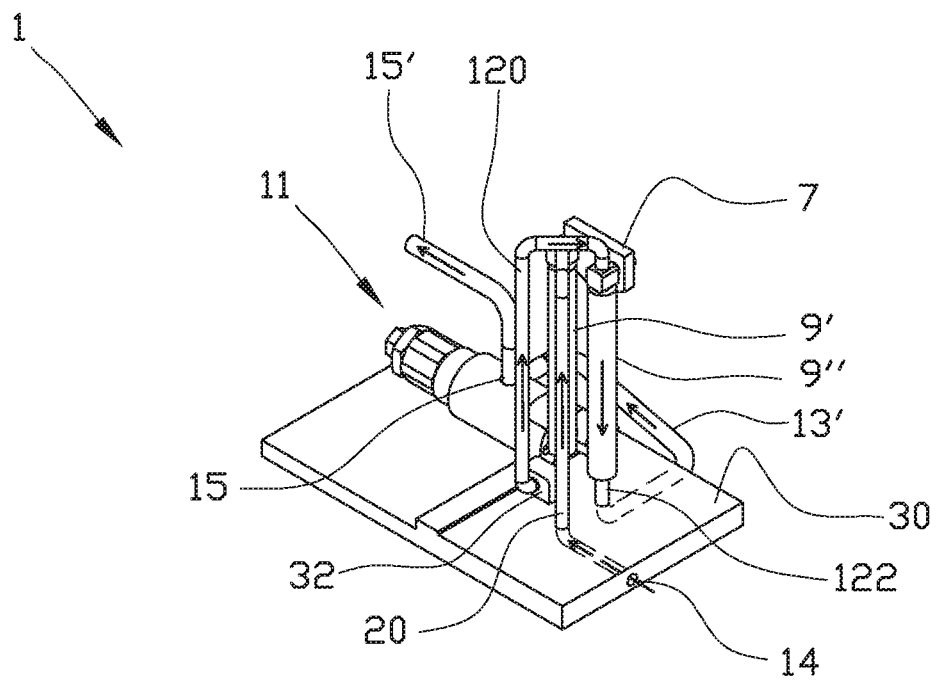
FIG. 2c-2d show in smaller scale the apparatus in FIG. 2a from other views.
Figure 2D:
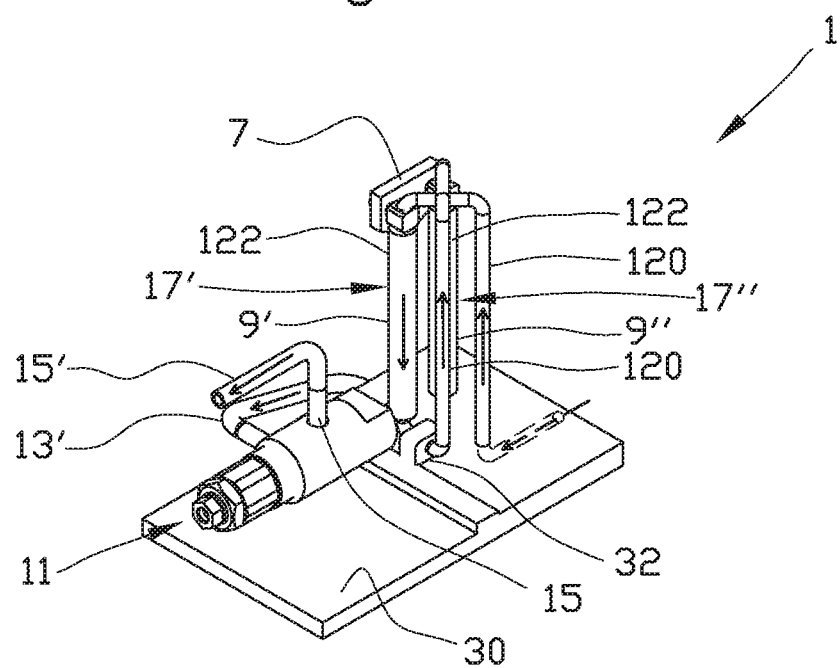

As best seen in FIG. 2a, FIG. 2c and FIG. 2d, each of the fluid conduit's first portion 120 and fluid conduit's second portion 122, i.e. the elongate members 17', 17" of the actuator device 17, is clamped to the second portion 7 of the gear mechanism 3 by means of a first pivot pin 18' and a second pivot pin 18" extending through two mutually distant apertures in the second portion 7.

Upon activating at least one of the thermal sources 9', 9", the mutual relationship of the length between the fluid conduit's first portion 120 and the fluid conduit's second portion 122 will change, and the second portion 7 of the gear mechanism 3 will be subjected to a pivoting movement. This pivoting movement of the second portion 7 will result in a movement of the first portion 5 of the gear mechanism 3. This is illustrated in FIG. 2e-FIG. 2g, wherein FIG. 2e shows the apparatus 1 with the valve 11 in partially open position, FIG. 2f shows the valve 11 in a fully open position, and FIG. 2g shows the valve 11 in a fully closed position.

In FIG. 2e, none of the thermal sources 9', 9" are activated. The arm 3 is in a vertical "neutral" position and the valve adjuster 12 of the valve 11 is in a mid-position.

In FIG. 2f, the thermal element 9' surrounding the fluid conduit's first portion 120 is activated in order to provide heating of the fluid conduit's first portion 120. The thermal element 9" surrounding the fluid conduit's second portion 122 is either not activated, or activated in order to provide cooling of the fluid conduit's second portion 122. Consequently, the relative length between the portions 120, 122 will change and the first portion 7 of the gear mechanism or arm 3 will be subjected to a pivoting movement as indicated in FIG. 2f. The first portion 5 of the gear mechanism or arm 3 thus urges the valve adjuster 12 of the valve 11 from the mid position shown in FIG. 2e to the position shown in FIG. 2f wherein the valve 11 is in an open position. The valve 11 may be the same type as the valve 11 shown in FIG. 1g.

The valve housing 11' is fixed to the base 30 in a manner known per se.

In FIG. 2g, the thermal element 9" surrounding the fluid conduit's second portion 122 is activated in order to provide heating of the fluid conduit's second portion 122. The thermal element 9' surrounding the fluid conduit's first portion 120 is either not activated, or activated in order to provide cooling of the fluid conduit's first portion 120. Consequently, the relative length between the portions 120, 122 will change and the first portion 7 of the gear mechanism or arm 3 will be subjected to a pivoting movement as indicated in FIG. 2g, i.e. opposite of that of FIG. 2f. The first portion 5 of the gear mechanism or arm 3 thus urges the valve adjuster 12 towards left in the drawing wherein the valve 11 of the type shown in FIG. 1g, is in a closed position.

One possible fluid flow through the apparatus 1 in accordance with a second embodiment of the invention may be as shown by arrows in FIG. 2a-FIG. 2g.

FIGS. 3a-3g show a third embodiment of the present invention.

Figure 3A:
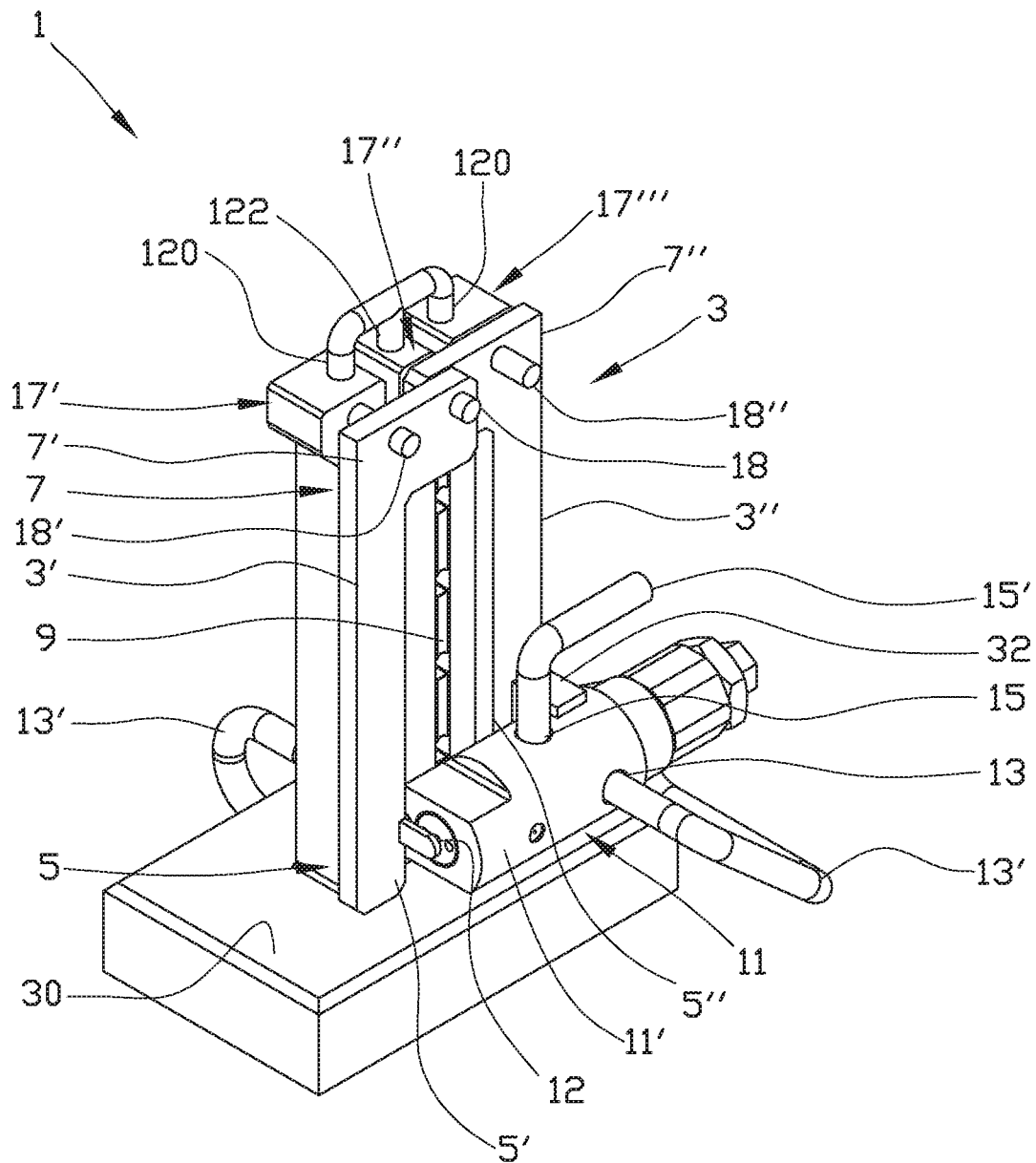
FIG. 3a shows a perspective view of an apparatus in accordance with a third embodiment of the present invention.
Figure 3B:
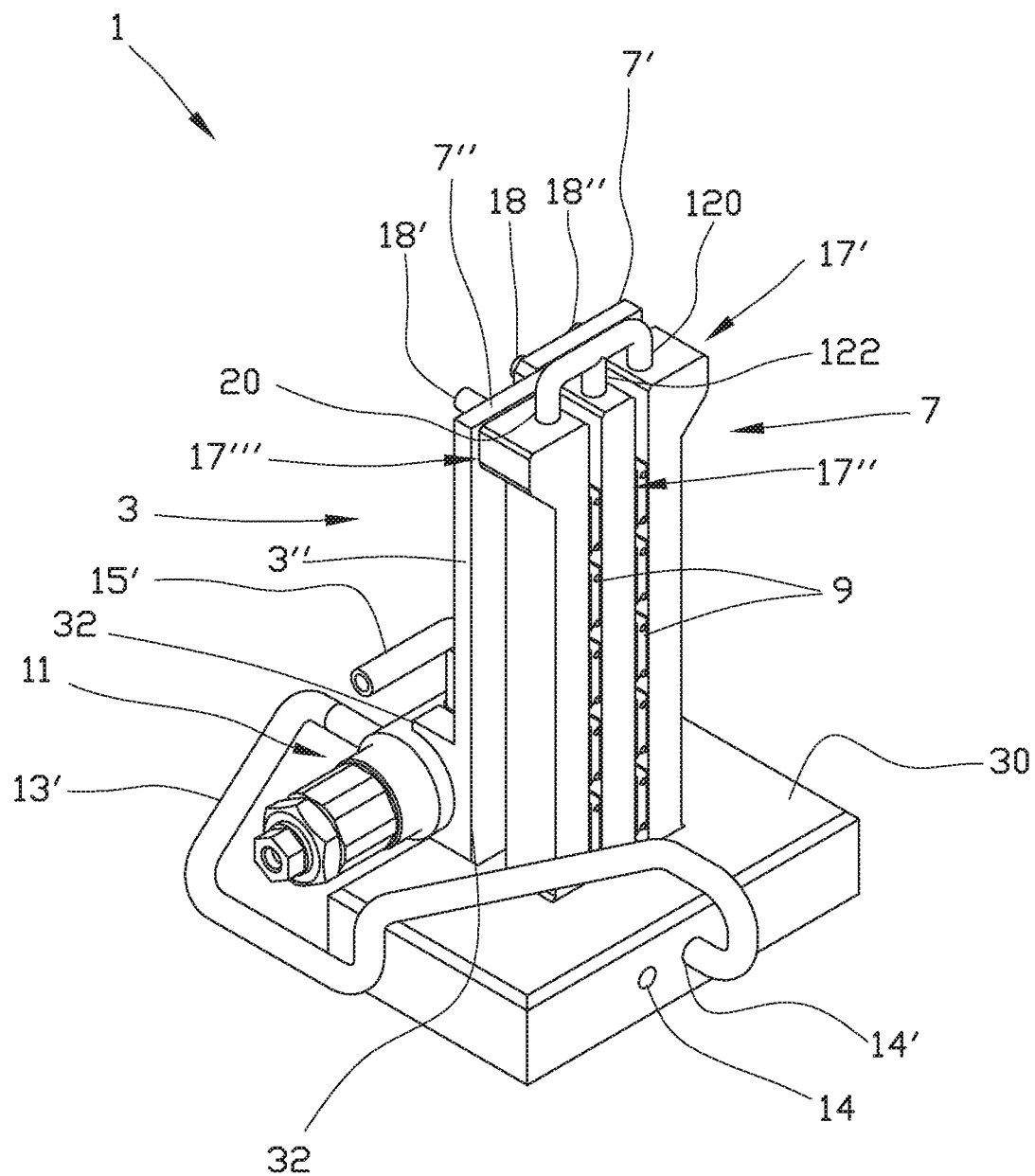
FIG. 3b shows the apparatus in FIG. 3a in another view.
Figure 3C:
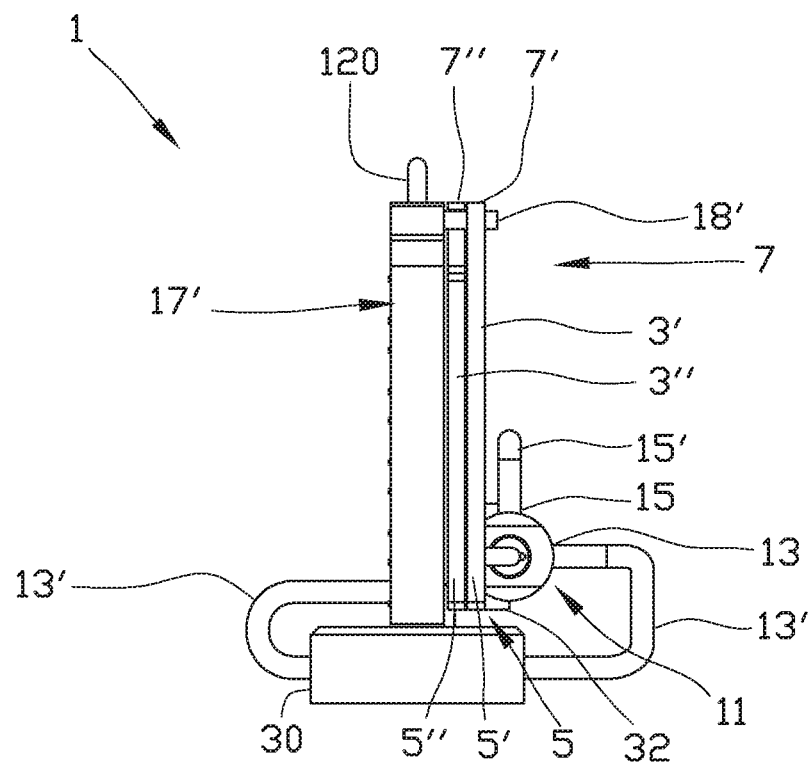
FIG. 3c shows a side view of the apparatus in FIG. 3a seen from behind.
Figure 3D:
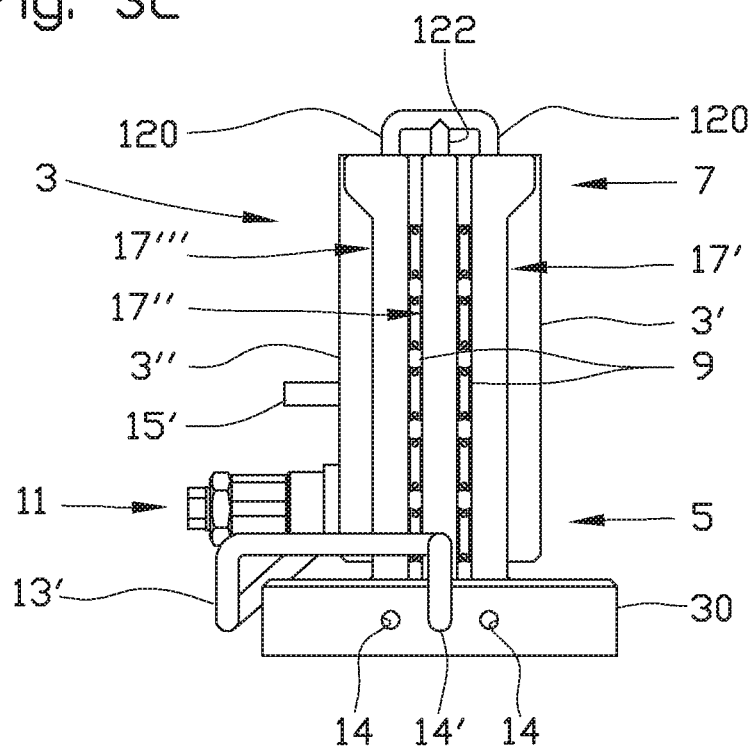
FIG. 3d shows a side view of the apparatus in FIG. 3b seen from right.
Figure 3E:
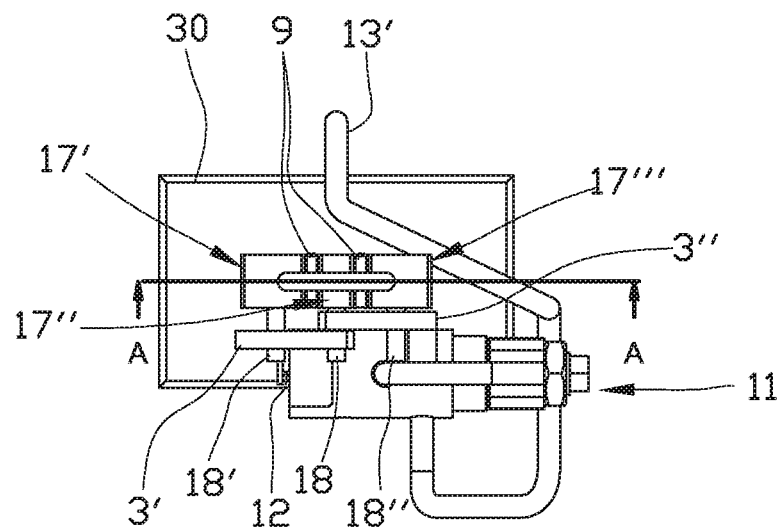
FIG. 3e shows a top view of the apparatus.
Figure 3F:
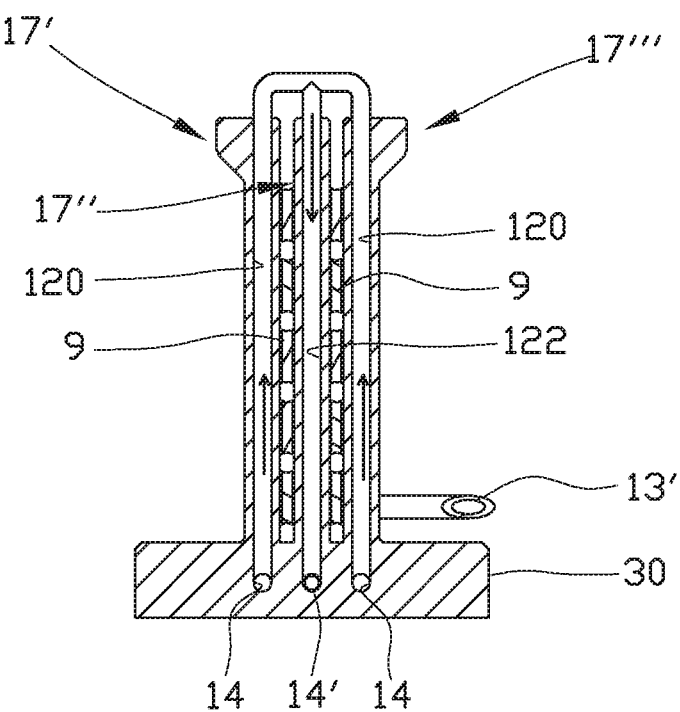
FIG. 3f shows a cut A-A in FIG. 3e, wherein a possible fluid flow through a portion of the apparatus is indicated by arrows.

FIG. 3a is a perspective view of an apparatus 1 wherein the gear mechanism 3 comprises a first portion 5 and a second portion 7. The gear mechanism 3 is constituted by means of two arms 3', 3"; a first arm 3' defined by a primary portion 5' and a first connecting part 7'; and a second arm 3" defined by a secondary portion 5" and a second connecting part 7".

The actuator device comprises three elongate members 17', 17", 17''' extending from a base 30. The elongate members 17', 17", 17''' are arranged in a "sandwich" arrangement comprising a shape transformation source 9. In the embodiment shown, the shape transformation source 9 is a Peltier element.

The first connecting part 7' of the first arm 3' is pivotally connected to a first-side elongate member 17' and to a middle elongate member 17" by means of pivot pins 18', 18 protruding from a top portion of the first-side elongate member 17' and middle elongate member 17", respectively.

The connecting part 7" of the second arm 3" is pivotally connected to a second-side elongate member 17''' and to the middle elongate member 17" by means of pivot pins 18", 18 protruding from a top portion of the second-side elongate member 17''' and middle elongate member 17", respectively.

Both of the first-side elongate member 17' and the second-side elongate member 17''' are connected to the pivot pin 18 protruding from the middle elongate member 17".

The primary portion 5' of the first arm 3' interacts with a valve adjuster 12 of a valve 11. The second portion 5" on the second arm 3" is connected to a housing 11' of the valve 11 by means of a clamp 32. The valve housing 11' is thus connected to the second arm 3" of the gear mechanism 3 and movable with respect to the base 30. This way of connecting the valve 11 to the gear mechanism 3 is comparable to the disclosure of first embodiment of the present invention shown in for example FIG. 1a.

In the third embodiment shown in FIG. 3a-FIG. 3h, the actuator device 17 comprises a fluid conduit having a first portion 120 and a second portion 122.

The first portion 120 of the fluid conduit runs within both the first-side elongate member 17' and the second-side elongate member 17''', and is in fluid communication with inlet channels 14 (see FIG. 3d and FIG. 3f) arranged in the base 30. The inlet channels 14 are in fluid communication with a fluid source (not shown).

After having passed through the first portion 120 of the fluid conduit, the fluid flows into the second portion 122 of the fluid conduit and runs within the mid portion elongate member 17". From the mid portion elongate member 17", the fluid flows via a channel 14' (see FIG. 3f) in the base 30 and via a fluid inlet conduit 13' into the fluid inlet 13 of the valve 11. The fluid flow through the actuator device 17 may be as illustrated by arrows in FIG. 3f which is a cut through A-A in FIG. 3e. The first portion 120 and the second portion 122 of the fluid conduit is preferably made by a flexible pipe in order to allow mutual movement of the elongate members 17', 17", 17'''.

As will be appreciated by a person skilled in the art, a Peltier element is capable of conducting heat from one side of the element to an opposite side of the element.

Figure 3G:
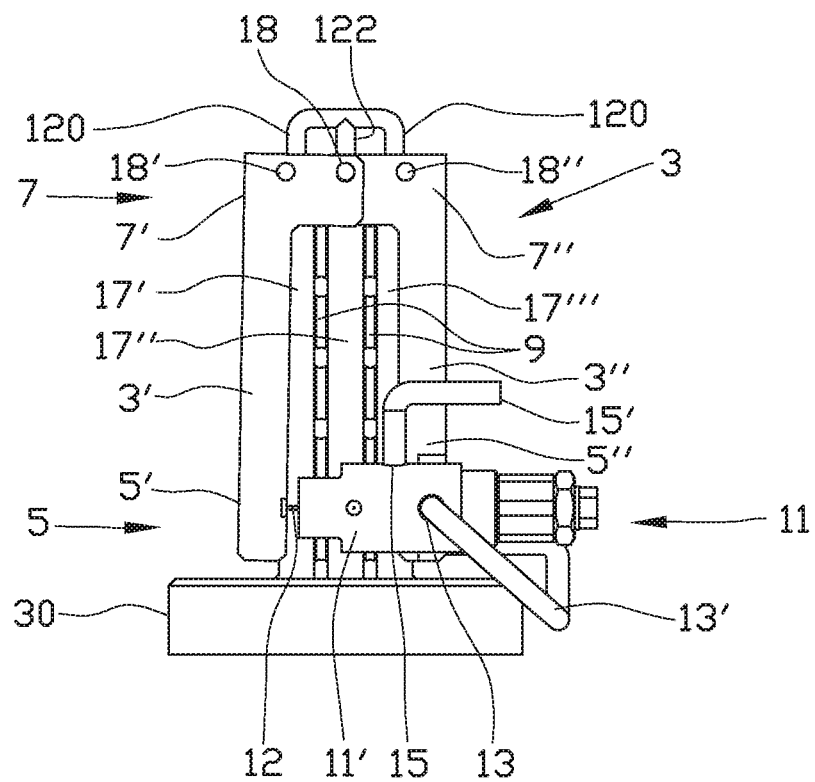
FIG. 3g-3h show side views of a working principle of a gear mechanism of the apparatus in FIGS. 3a-3f affecting a valve.

In FIG. 3g the Peltier element 9 has been activated so that the first-side elongate member 17' and the second-side elongate member 17''' are heated, while the mid elongate member 17" is cooled. Thus, the first- and second-side elongate members 17', 17''' have been subject to an increase in length, while the mid portion elongate member 17" has been subject to a decrease in length. The first portion 7 of the gear mechanism 3, i.e. the first connecting point 7' and the second connecting point 7", has been subject to a pivoting movement that has urged the primary portion 5' of the gear mechanism's 3 first arm 3' in an opposite direction of the secondary portion 5" of the gear mechanism's 3 second arm 3". The primary portion 5' interacting with the valve adjuster 12 of the valve 11, has been urged towards the left in the drawing, while the secondary portion 5" connected to the valve housing 11' has been urged towards the right. The valve 11 is in a closed position.

Figure 3H:
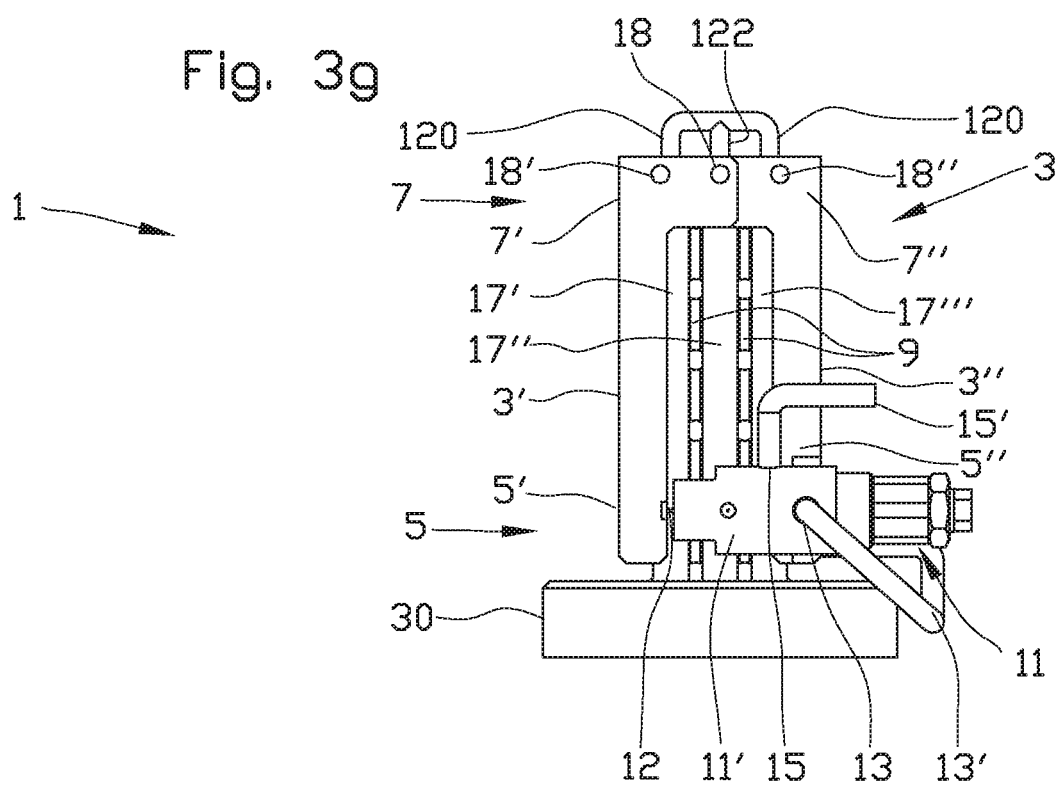

In FIG. 3h, the Peltier element 9 has been "reversed", i.e. the first-side elongate member 17' and the second-side elongate member 17''' has been cooled, while the mid elongate member 17" has been heated. The primary portion 5' of the gear mechanism's 3 first arm 3' interacting with the valve adjuster 12 has been urged towards the right, while the secondary portion 5" connected to the valve housing 11' has been urged towards the left. The valve 11 is in an open position.

The third embodiment of invention discussed above may be denoted a "wet apparatus".

It should be noted that the apparatus shown in FIG. 3a-FIG. 3h may be used also as a "dry apparatus", i.e. without the fluid conduit 120, 122 running through the actuator device 17', 17", 17'''. The fluid may flow directly from a fluid source (not shown) to the valve fluid inlet 13, through the valve 11 and from the valve fluid outlet 15 to a destination (not shown).

As explained for the first embodiment of the invention, the "wet apparatus" has advantageous features in view of the "dry apparatus" and may therefore be preferred.

In the third embodiment shown in FIGS. 3a-3h, the valve 11 is carried by the first arm 3' and the second arm 3". The gearing effect of the apparatus may thus be changed by changing the effective length of the arms 3', 3". In such a case the fluid inlet conduit 13' is preferably flexible so that the it does not have to be changed when changing the effective length of the arms 3', 3".

Figure 4B:
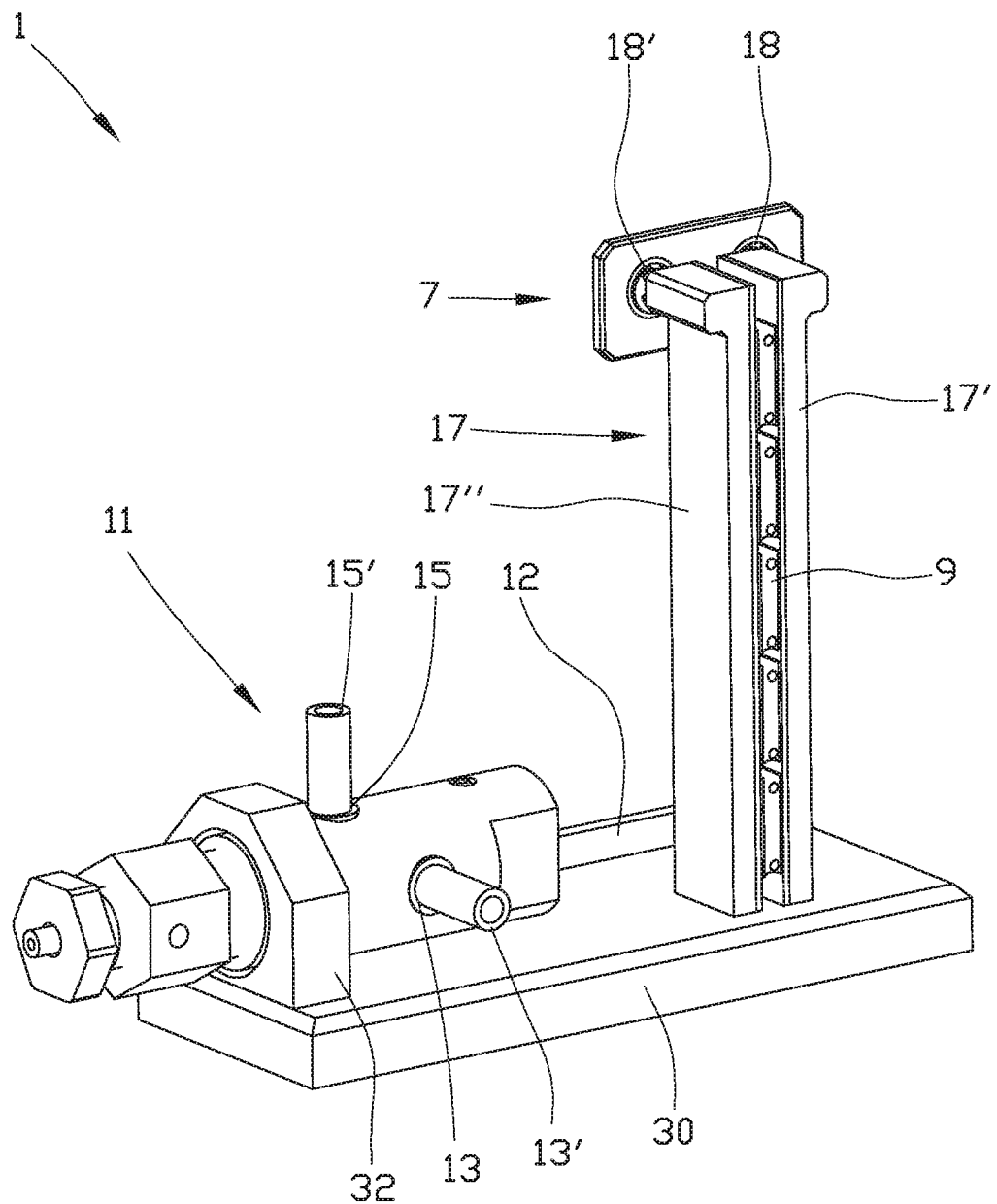
FIG. 4b shows the apparatus in FIG. 4a in another view.

FIG. 4a and FIG. 4b show a fourth embodiment of the present invention.

In FIG. 4a and FIG. 4b, the gear mechanism 3 comprises an arm defined by a first portion 5 connected to a valve adjuster 12 of a valve 11, and a second portion 7 pivotally connected to an actuator device 17.

The actuator device comprises two separate elongate members 17', 17" arranged in a "sandwich" arrangement comprising a shape transformation source 9 arranged between the elongate members 17', 17". In the embodiment shown, the shape transformation source 9 is a Peltier element.

The first portion 5 of the gear mechanism 3 is interacting with a valve adjuster 12 of the valve 11 fixedly connected to a base 30 by means of a clamp 32.

The second portion 7 of the gear mechanism 3 is connected to each of the elongate members 17', 17" by means of pivot pins 18, 18'.

Upon activating the Peltier element 9, one of the elongate members 17', 17" will be heated, while the other one of the elongate members 17', 17" will be cooled. The mutual length of the elongate members 17', 17" will thus change, and the second portion 7 of the gear mechanism will be subject to a pivoting movement as discussed for the second and third embodiments of the present invention. The valve 11 may thus be controlled by means of the Peltier element 9 between extreme positions fully closed and fully open and any positions therebetween.

The apparatus shown in FIGS. 4a and 4b is a "dry apparatus" as the fluid flows through the valve 11 only and not through the actuator device 17.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements.

The mere fact that certain measures are recited in mutually different dependent claims does not indicate that a combination of these measures cannot be used to advantage.

The invention claimed is:

1. An apparatus for controlling a fluid flow, the apparatus comprising a valve provided with a valve adjuster for controlling a fluid flow through the valve, the valve comprising a fluid inlet in fluid communication with a fluid inlet conduit, and a fluid outlet in fluid communication with a fluid outlet conduit, for flowing fluid through the valve, wherein the apparatus is further comprising an actuator device capable of undergoing a change in shape, said change in shape of the actuator device providing via a connecting member an attenuated or amplified displacement of a fixation point connected to the valve adjuster, when compared to the change in shape of the actuator device, wherein the connecting member is part of a gear mechanism comprising a first portion and a second portion, the fixation point being the first portion, and wherein the actuator device is connected to the second portion of the gear mechanism, the actuator device configured for undergoing said change in shape via a shape transformation source;
   wherein the gear mechanism is configured to provide a movement of the first portion being different from a movement of the second portion upon activation of the shape transformation source,
   wherein the actuator device comprises a fluid conduit having a first portion and a second portion, one of which being in fluid communication with the fluid inlet of the valve, and in that at least one of the first portion and second portion of the fluid conduit is provided with and is arranged to be influenced by the shape transformation source in the form of a cooling element, a heating element or a combination thereof.

2. The apparatus in accordance with claim 1, wherein the second portion of the gear mechanism comprises two connecting parts; a first connecting part connected to a first end portion of an elongate member, and a second connecting part connected to a second end portion of the elongate member; wherein the first portion of the gear mechanism being arranged in a non-rectilinear member also extending between the connecting parts, and wherein a distance between the first portion and the elongate member is different from the distance between the elongate member and the non-rectilinear member at the connecting parts.

3. The apparatus in accordance with claim 1, wherein the actuator device comprises at least two separate elongate members, at least one of the members being configured for undergoing change in shape upon activation of the shape transformation source.

4. The apparatus in accordance with claim 3, wherein the gear mechanism comprises at least one arm defined by the first portion and the second portion, the second portion being pivotally connected to two of the at least two separate members via pivot connections.

5. The apparatus in accordance with claim 4, wherein the pivot connections are arranged spaced apart with a first distance, and wherein the effective length of the arm is different from said first distance.

6. The apparatus in accordance with claim 1, wherein each of the first portion of the fluid conduit and the second portion of the fluid conduit extends between the connecting parts, one of the connecting parts providing fluid communication between the first portion and the second portion, the other one of the connecting parts serving as a connection means for communicating fluid into and out of the actuator device comprising the fluid conduit, wherein one of the first portion and second portion extends rectilinear between the connecting parts, while the other of the first portion and second portion extends non-rectilinear between said connecting parts.

7. The apparatus in accordance with claim 6, wherein the non-rectilinear portion has a substantially convex shape with respect to the rectilinear fluid conduit extending between the connecting parts.

8. The apparatus in accordance with claim 6, wherein the non-rectilinear portion has a substantially concave shape with respect to the rectilinear fluid conduit extending between the connecting parts.

9. The apparatus in accordance with claim 1, wherein the non-rectilinear portion of the fluid conduit comprises a first conduit and a second conduit, the conduits being mirror-inverted about the rectilinear fluid conduit, and wherein the second conduit being connected to a body of the valve.

10. The apparatus in accordance with claim 5, wherein each of the first portion of the fluid conduit and the second portion of the fluid conduit forms part of at least one of the elongate members.

11. An apparatus for controlling a fluid flow, the apparatus comprising:
a valve provided with a valve adjuster controlling a fluid flow through the valve, the valve comprising a fluid inlet in fluid communication with a fluid inlet conduit, and a fluid outlet in fluid communication with a fluid outlet conduit controlling flowing fluid through the valve;
an actuator extendable to change a length thereof, wherein the actuator device is coupled at a first end to a first connecting part and at a second end opposite the first end to a second connecting part; and
first and second connecting members each coupled at a first end to the first connecting part and each coupled at a second end opposite the first end to the second connecting part, wherein changing the length of the actuator changes a distance between the first and second connecting members, and wherein changing the distance between the first and second connecting members changes a position of the valve adjuster relative to the valve to thereby change the fluid flow therethrough.

12. The apparatus according to claim 11, wherein the actuator comprises an elongated member moveable to change the length of the actuator, and wherein the elongated member is positioned between the first and second connecting members.

13. The apparatus according to claim 12, wherein the elongated member is equally positioned between the first and second connecting members, and wherein the elongated member and the first and second connecting members are all moveable within a common plane.

14. The apparatus according to claim 11, wherein the elongated member moves parallel to the valve adjuster.

15. The apparatus according to claim 11, wherein an angle between relative axes of the elongated member and the valve adjuster changes when the actuator is extended.

16. The apparatus according to claim 11, wherein movement of the elongated member a first distance causes movement of the valve adjuster by a second distance that is greater than the first distance.

17. The apparatus according to claim 11, wherein the actuator is extendable via fluid flow thereto.

18. The apparatus according to claim 11, wherein extension of the actuator is thermally controlled.

19. The apparatus according to claim 18, further comprising a heating element that surrounds a portion of the actuator to thereby thermally control the extension thereof.

20. The apparatus according to 11, wherein control of the fluid flow of the valve is self-regulating such that sediment flowing therethrough reduces the fluid flow, thereby increasing a temperature of the actuator, thereby causing the elongated member to extend, and thereby moving the valve adjuster to open the valve to increase the fluid flow.

* * * * *